United States Patent
Takeda et al.

(10) Patent No.: US 8,242,913 B2
(45) Date of Patent: Aug. 14, 2012

(54) RFID TAG COMMUNICATION APPARATUS

(75) Inventors: Michihiro Takeda, Kiyosu (JP);
Mitsuru Nakamura, Kasugai (JP);
Tomoyasu Fukui, Inuyama (JP)

(73) Assignee: Brother Kogyo Kabushiki Kaisha,
Nagoya-Shi, Aichi-Ken (JP)

( * ) Notice: Subject to any disclaimer, the term of this patent is extended or adjusted under 35 U.S.C. 154(b) by 584 days.

(21) Appl. No.: 12/454,664

(22) Filed: May 21, 2009

(65) Prior Publication Data
US 2009/0295547 A1 Dec. 3, 2009

(30) Foreign Application Priority Data

May 27, 2008 (JP) ................. 2008-137404

(51) Int. Cl.
*G08C 19/12* (2006.01)
*G08B 13/14* (2006.01)
*H01Q 1/12* (2006.01)
(52) U.S. Cl. ............. 340/572.5; 340/572.1; 340/10.3; 340/13.2; 340/13.25; 340/13.26; 343/895; 343/700 MS; 343/872; 343/878; 343/886
(58) Field of Classification Search .............. 340/572.1, 340/572.5, 10.3, 13.2, 13.25, 13.26; 343/895, 343/700 MS, 872, 878, 886, 890
See application file for complete search history.

(56) References Cited

U.S. PATENT DOCUMENTS

| 6,377,176 | B1 * | 4/2002 | Lee ............................ 340/572.1 |
| 2007/0139285 | A1 | 6/2007 | Maruyama |
| 2008/0194200 | A1 * | 8/2008 | Keen et al. ................... 455/41.1 |
| 2009/0273474 | A1 | 11/2009 | Nonaka |

FOREIGN PATENT DOCUMENTS

| EP | 1 560 149 | 8/2005 |
| JP | 08 263609 | 10/1996 |
| JP | 2000148932 A | 5/2000 |
| WO | 2007/116830 | 10/2001 |

* cited by examiner

*Primary Examiner* — Jennifer Mehmood
*Assistant Examiner* — Andrew Bee
(74) *Attorney, Agent, or Firm* — McCarter & English, LLP

(57) ABSTRACT

This disclosure discloses an RFID tag communication apparatus comprising: a housing including a bottom surface; an antenna provided at a distance h from the bottom surface; and a radio frequency circuit including a carrier wave transmitting device that generates a carrier wave of a frequency fc; wherein the correlation as fo<fc<fm is satisfied under the conditions of a resonance frequency fm of the antenna when the bottom surface is fixed in contact with a metal surface, a resonance frequency fo of the antenna when the bottom surface is fixed in contact with a non-metal surface.

3 Claims, 7 Drawing Sheets

RFID TAG COMMUNICATION APPARATUS

CROSS-REFERENCE TO RELATED APPLICATIONS

This application claims priority from JP 2008-137404, filed May 27, 2008, the contents of which are hereby incorporated by reference.

BACKGROUND

1. Field

The present disclosure relates to an RFID tag capable of communicating with an external source, and an RFID tag communication apparatus capable of transmitting and receiving information by wireless communication.

2. Description of the Related Art

In general, it has been known that the reliability of wireless communication can be improved by using a frequency (=resonance frequency) best suited to the frequency characteristics of the antenna used in the wireless communication. Use of such frequency is particularly effective in cases where there is a long communication distance. An RFID tag communication apparatus that performs communication with an RFID tag and takes into consideration resonance frequency such as described above is presented in JP, A, 2000-148932, for example.

In this prior art, when the RFID tag communication apparatus is brought near an RFID tag and communication is performed, the inductance of the apparatus antenna of the RFID tag communication apparatus increases due to mutual induction with the tag antenna of the RFID tag. The resonance frequency of the apparatus antenna is therefore set to a low value in advance with the amount of this increase in mind.

In recent years, increased use of RFID tags has resulted in a wide variety of RFID tag applications and, in turn, a wide variety of forms of use of RFID tag communication apparatuses that perform communication with RFID tags in accordance with these applications. For example, needs such as the need to install an RFID tag communication apparatus on an installation surface made of metal, such as a steel desk, PC rack, or metal rack or shelf, and use the installed apparatus in an office or the home continue to emerge.

Nevertheless, in a case where the RFID tag communication apparatus is provided on a metal installation surface such as described above, the resonance frequency of the apparatus antenna is affected by the metal and therefore fluctuates. Conversely, in a case where the RFID tag communication apparatus is provided on a non-metal installation surface, there is no such effect and the resonance frequency does not fluctuate. Thus, when relatively good communication efficiency is desired in either case under the premise of such resonance frequency fluctuation, some type of device is needed to set the proper resonance frequency of the apparatus antenna (to set the resonance frequency with the RFID tag communication apparatus established as a single unit not placed on a metal installation surface or a non-metal installation surface).

In the above-described prior art, the fluctuation of such resonance frequency related to a metal installation surface and non-metal installation surface was not particularly taken into consideration.

SUMMARY

It is therefore an object of the present disclosure to provide an RFID tag communication apparatus capable of maintaining good communication characteristics whether installed on a metal installation surface or a non-metal installation surface.

An aspect of the present application for achieving the above-described object is an RFID tag communication apparatus comprising a housing constituting an equipment shell including a bottom surface fixed in contact with a predetermined installation surface; an antenna provided along the bottom surface at a distance h from the bottom surface that transmits and receives information by wireless communication with an RFID tag including an IC circuit part that stores information and a tag antenna that transmits and receives information; and a radio frequency circuit including a carrier wave transmitting device that generates a carrier wave of a frequency fc for supplying power to the RFID tag, that transmits and receives information with the RFID tag; the frequency fc and the distance h being set to satisfy the correlation as: fo<fc<fm under the conditions that fm is set for a resonance frequency of the antenna when the bottom surface is fixed in contact with the installation surface made of a metal, and fo is set for a resonance frequency of the antenna when the bottom surface is fixed in contact with the installation surface made of a non-metal or the bottom surface is separated from the installation surface resulting in a single unit state of the RFID tag communication apparatus.

In the RFID tag communication apparatus of the first aspect of the present disclosure, a carrier wave generated by the carrier wave transmitting device of the radio frequency circuit is transmitted to an RFID tag by an antenna so as to supply power to the RFID tag and, as a result, transmit and receive information by wireless communication with the RFID tag.

Here, each antenna has a specific resonance frequency and, during the above-described wireless communication, the communication efficiency increases to the extent that the resonance frequency coincides with (is close to) the frequency of the aforementioned carrier wave. Further, in a case where the RFID tag communication apparatus is disposed on a metal installation surface, for example, and is thus positioned close to metal, the resonance frequency of the above-described antenna is affected by the communication interference from that metal, causing the value of the resonance frequency to fluctuate and increase in comparison to a case of no metal. Further, the fluctuating range (the value by which the resonance frequency increases) at that time increases and decreases in accordance with the distance between the antenna and metal, resulting in the resonance frequency varying (increasing) to a more significant degree as the distance between the antenna and metal decreases.

Here, in the first aspect of the present disclosure, the distance from the bottom surface (in other words, the distance from the installation surface; hereinafter the same) is kept constant within a certain range by placing the antenna along the bottom surface, keeping in mind that the apparatus is used in a form where the bottom surface of the housing contacts the installation surface. Furthermore, the first aspect of the present disclosure separates the antenna from the bottom surface by a distance h, thereby suppressing to within a certain range the fluctuating range (the difference |fm−fo| between the resonance frequency fo when the bottom surface is fixed to a non-metal installation surface or separated from the installation surface, and the resonance frequency fm when the bottom surface is fixed to a metal installation surface) of the resonance frequency of the antenna, even in a case where the installation surface is made of metal.

Then, in a state where the difference between the resonance frequency fo when the bottom surface is fixed to a non-metal installation surface (or separated from the installation surface) and the resonance frequency fm when the bottom surface is fixed to a metal installation surface is suppressed to within a limited range by the setting of such a distance h, the frequency of the carrier wave fc of the carrier wave transmitting device is set within that limited range, that is, so that fo<fc<fm.

With these values set in this manner, the difference between the resonance frequency fo when the bottom surface is fixed to a non-metal installation surface (or separated from the installation surface) and the carrier wave frequency fc can be made relatively small, and the difference between the resonance frequency fm when the bottom surface is fixed to a metal installation surface and the carrier wave frequency fc can also be made relatively small.

As described above, in the first aspect of the present disclosure, the separated distance h of the antenna defined by the fluctuating range |fm−fo| of the resonance frequency, and the carrier wave frequency fc that is set within that fluctuating range |fm−fo| are set in mutual association. Such settings make it possible to establish the resonance frequency and the carrier wave frequency relatively close to each other regardless of whether the bottom surface is fixed to a non-metal installation surface (or separated from the installation surface) or fixed to a metal installation surface, thereby maintaining high communication efficiency.

DETAILED DESCRIPTION OF THE PREFERRED EMBODIMENTS

The following describes an embodiment of the present disclosure with reference to accompanying drawings.

Figure 1:
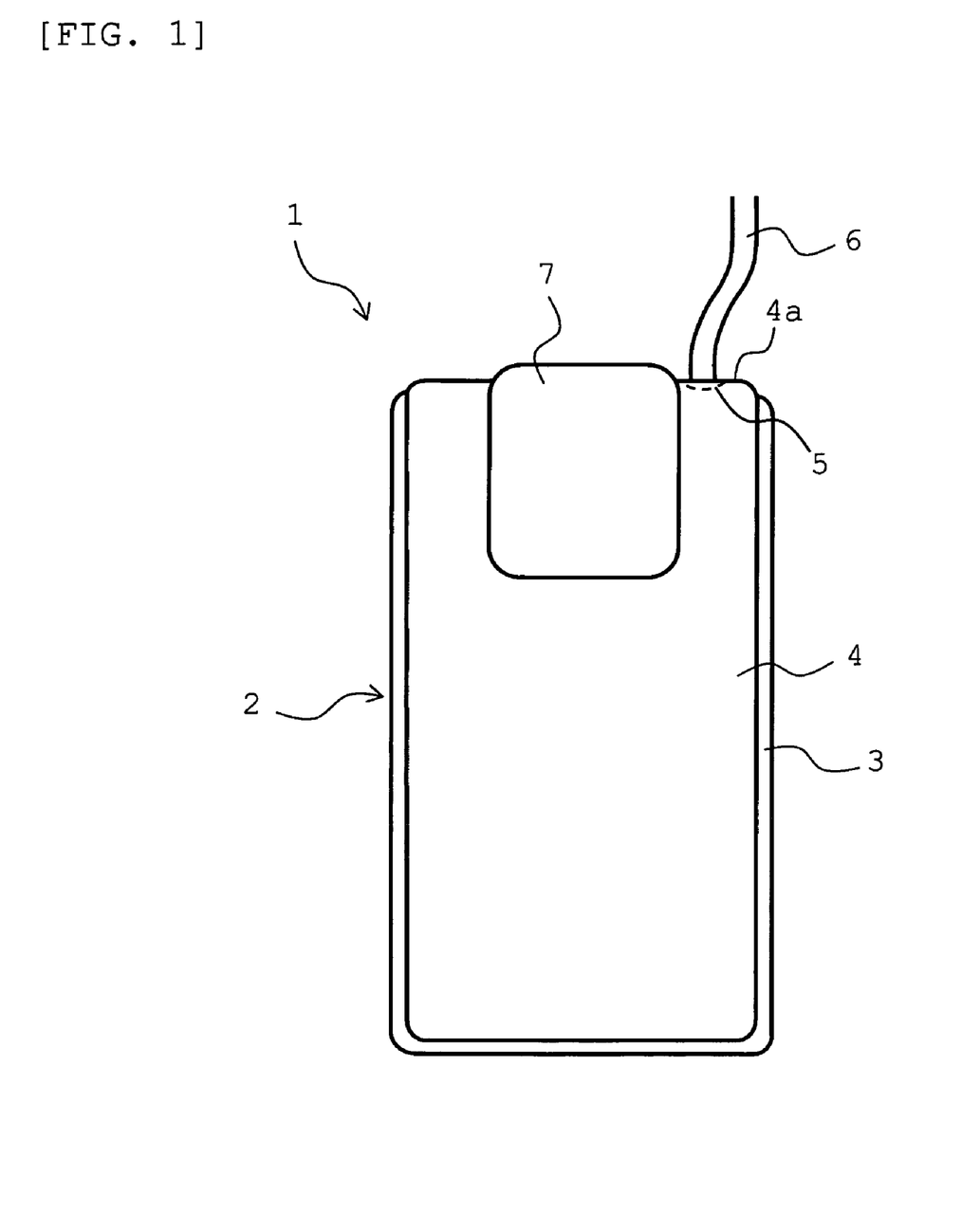
FIG. 1 is a planar view showing a reader according to an embodiment of the present disclosure.
Figure 2:
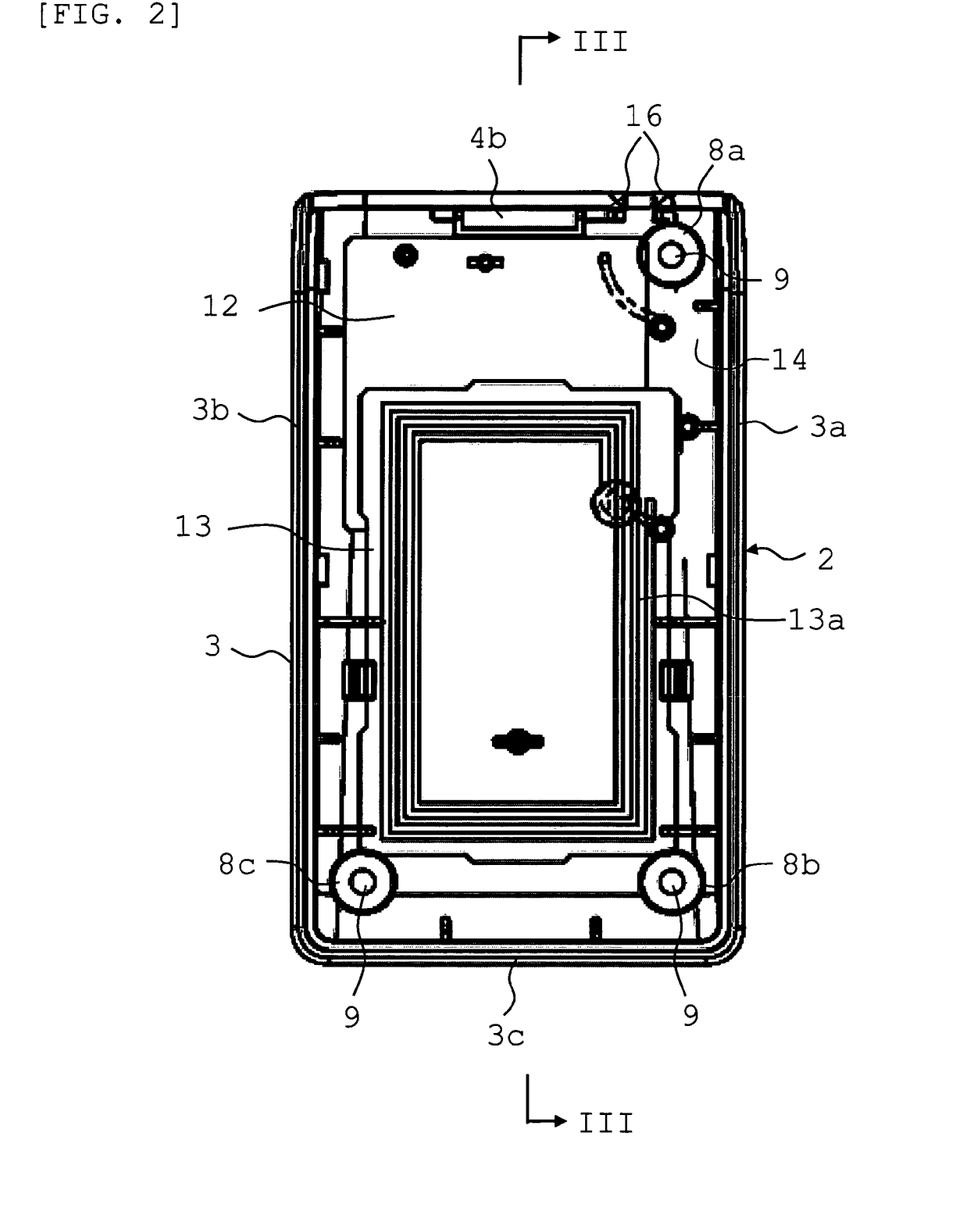
FIG. 2 is a planar view of the reader with the cover removed (a cable is not shown for simplicity's sake).
Figure 3:
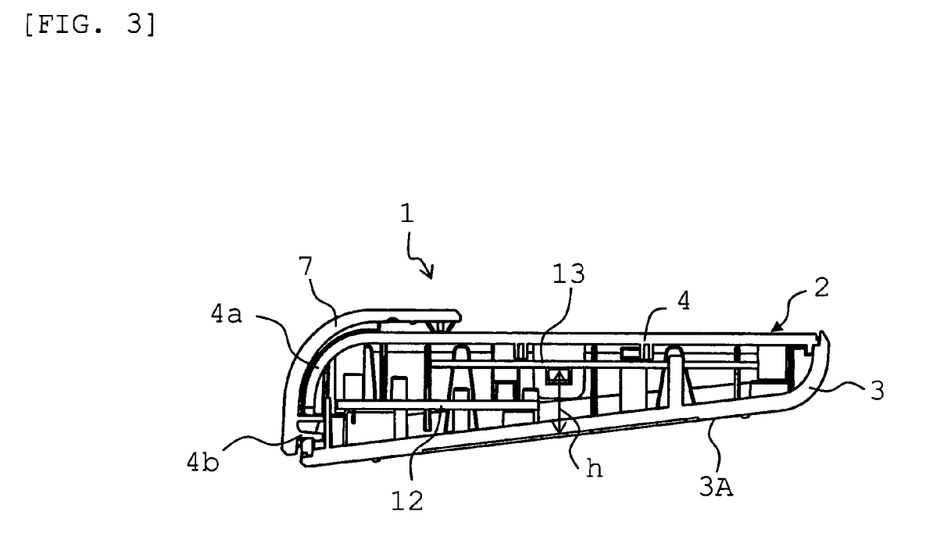
FIG. 3 is a vertical cross-sectional view of the reader based on the cross-section III-III of FIG. 2.

As shown in FIG. 1, FIG. 2, and FIG. 3, a reader 1 of the present embodiment comprises a compact housing 2 that constitutes an equipment shell, and is designed to be used when installed (fixed) to a suitable installation surface by a user (or when held by the user via the housing 2 while placed on an installation surface). An opening 5 for pulling the cable 6 used for power supply and signal transmission and reception into the housing 2 is provided on the front part (the upper side in FIG. 1 and FIG. 2) of the housing 2.

The housing 2 comprising a lower case 3 of a thin rectangular dish-like shape having a front end side that is open in the width direction, and the lid 4 of a flat rectangular shape that is installed on top of this lower case 3. The lower case 3 comprises a bottom surface 3A that comes in contact with the above-described installation surface when the reader 1 is placed on the installation surface, and inclines, in this example, in a direction in which the rear end side ascends toward the lid 4. A flange part 4a that curves downward and covers the opening of the front end of the lower case 3 is formed on the front end of the lid 4.

The opening 5 through which the cable 6 is pulled into the housing 2 is provided on the right side in the width direction of the lower part of the flange part 4a (refer to FIG. 1). An installation part 4b for mounting a clip 7 inserted through the flange part 4a of the lid 4 is provided at the center of the width direction on the inside of the opening of the front end of the lower case 3. The clip 7 comprises a bent shape that follows the flange part 4a, and is mounted to the installation part 4b so as to extend to the upper surface part of the lid 4. The clip 7 can also be installed upside down so as to be positioned on the lower surface side of the lower case 3 (not shown).

On the bottom part of the lower case 3, a cylinder-shaped first boss part 8a, second boss part 8b, and third boss part 8c for screwing in the lid 3 are respectively provided in the corner areas, excluding the front left side corner area, of the lower case 3, that is, in the front right side corner area, rear right side corner area, and rear left side corner area. The lid 4 covers the lower case 3, overlapping the boss parts of the lid 4 corresponding to the boss parts 8a to 8c of the lower case 3, and is installed to the lower case 3 by inserting screws (not shown) from the lower surface of the lower case 3 through through-holes 9 provided in the boss parts 8a to 8c of the lower case 3 and screwing the inserted screws into screw holes provided in the boss parts of the lid 4.

Further, a control board 12 and an antenna 13 electrically connected to the control board 12 are provided inside the housing 2. The control board 12 is a square-shaped electronic circuit board on which electronic circuits such as a radio frequency circuit 131 (refer to FIG. 4 described later) are mounted. This control board 12 is installed parallel to the upper surface part of the lid 4, at a position near the bottom part of the lower case 3, and extends from the location where the lower case 3 contacts the installation part 4b to near the center part of the lower case 3. The control board 12, in this example, is disposed toward a left wall part 3b on the left side (the right side in FIG. 1 and FIG. 2) of the lower case 3, with the area near the front end of its right side (the right side in FIG. 1 and FIG. 2) contacting the side surface of the first boss part 8a of the lower case 3. As a result, a space 14 where the cable 6 is laid is formed between the control part 12 and the right wall side 3a of the lower case 3.

The antenna 13 is a rectangular sheet body provided so that an antenna conductor 13a forms a square-shaped loop coil, and is installed parallel to the control board 12 at a position higher than the control board 12 (refer to FIG. 3). As a result, the antenna 13 has a positional relationship such that it follows along the bottom surface 3A of the lower case 3 (in this example, at somewhat of an incline), and the distance h to the bottom surface 3A is within a predetermined range (h1≦h≦h2; refer to FIG. 5 described later). Further, the antenna 13 is disposed from above the center part of the control board 12 to a position of contact with the second boss part 8b and the third boss part 8c near a rear wall part 3c of the lower case 3.

A pair of guide projections 16 positioned at the opening 5 on the lower right side of the flange part 4a of the lid 4 is provided on the right side of the front end of the lower case 3 (refer to FIG. 2). The cable 6 connected to an external electrical device 130 (refer to FIG. 4 described later), such as a PC, is pulled between the guide projections 16 and into the housing 2. Then, the cable 6 is laid so as to hug the bottom part of the lower case 3, following along the right side part and rear side part of the control board 12, and is connected to the control board 12 via a connector 15 provided at the tip of the cable 6 (refer to FIG. 4 described later) and a board-side connector 135 provided at a position on the left side of the rear side part of the control board 12 (refer to FIG. 4 described later).

Figure 4:
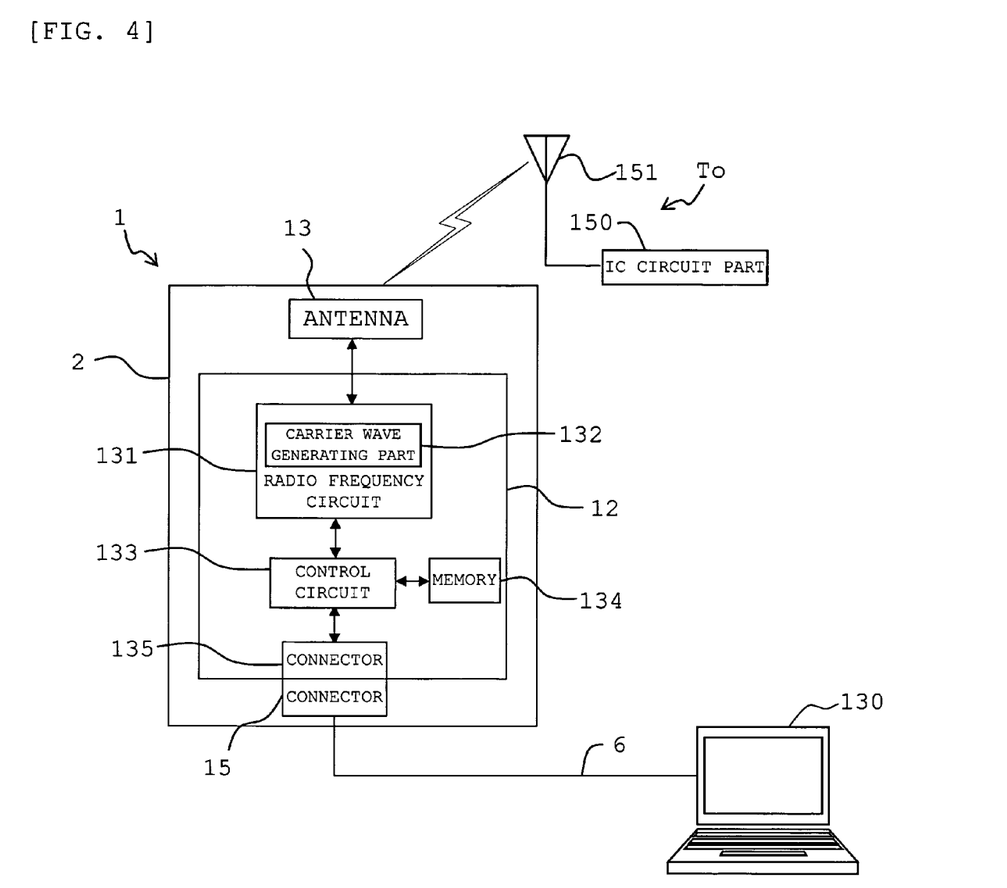
FIG. 4 is a block view showing the functional configuration of the reader.

As shown in FIG. 4, the reader 1 comprises the control board 12 and the antenna 13 configured to transmit and receive information by wireless communication with an RFID circuit element To [included in an RFID tag (not shown) comprising an RFID label and RFID tag card, for example], which is the communication target, in the housing 2. The control board 12 comprises the radio frequency circuit 131 configured to access an IC circuit part 150 by wireless communication via a tag antenna 151 of the RFID circuit element To and to process a signal read from that RFID circuit element To, a control circuit 133 configured to control the reader 1 in general including the radio frequency circuit 131, a memory 134 configured to store information, and the board-side connecter 135. The radio frequency circuit 131 includes a carrier wave generating part 132 configured to generate a carrier wave of a frequency fc for supplying power to the RFID circuit element To. Furthermore, the other end of the cable 6 is connected to the PC 130 in this example, and the reader 1 is supplied with power from the PC 130 via the cable 6.

Figure 5:
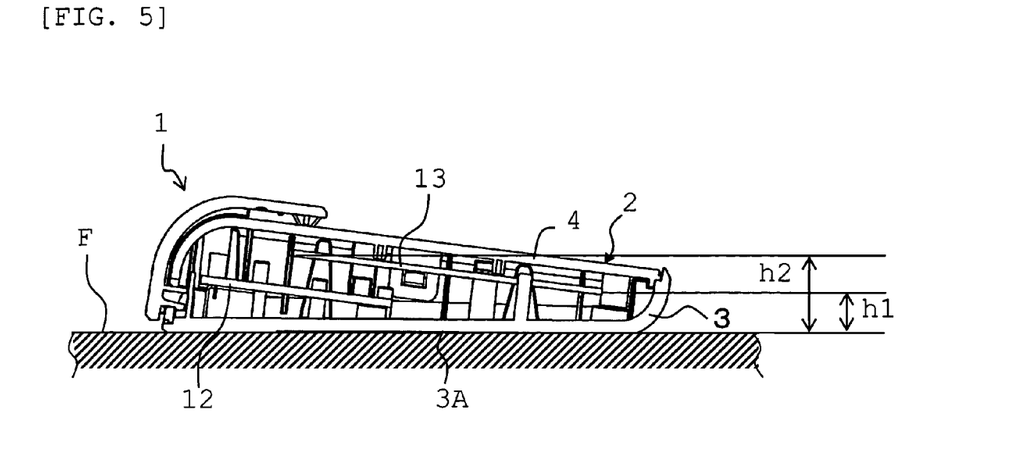
FIG. 5 is a vertical cross-sectional view showing the reader in use.

The reader 1, as shown in FIG. 5, is mainly used with the bottom surface 3A of the lower case 3 of the housing 2 in contact with the top of an installation surface F and fixed to the installation surface F. In the present embodiment, when the reader 1 is fixed and used in this manner, high communication efficiency can be maintained during wireless communication with the RFID circuit element To, regardless of whether the installation surface F in contact with the bottom surface of the housing 2 is made of a metal or a non-metal. To achieve this, the separated distance h from the bottom surface 3A of the antenna 13 (where maximum h=h1 and minimum h=h2 for reasons described above, that is, where h1≦h≦h2) and the frequency fc of the carrier wave generated from the carrier wave generating part 132 are set in mutual association. A detailed description follows.

Figure 6:
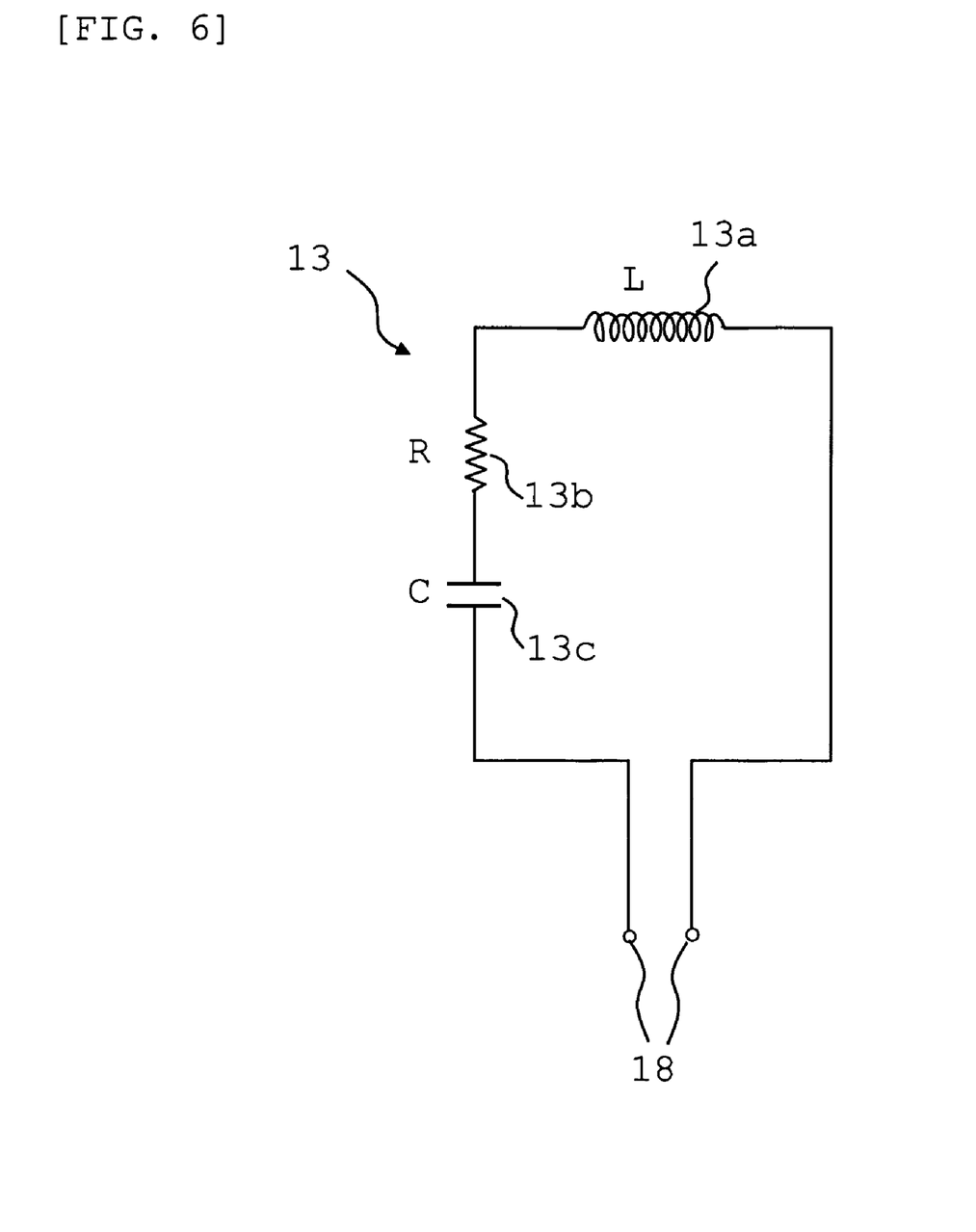
FIG. 6 is an equivalent circuit diagram of an antenna provided to the reader.

As shown in FIG. 6, the antenna 13 is shown in a form where the antenna coil 13a (inductance value L) connected between power supply terminals 18 and 18 from the control board is connected in series with a resistor 13b (resistance value R) for line loss and a capacitor 13c (capacitance C) for resonance. In this case, the resonance frequency f of the antenna 13 is mathematically expressed as follows:

$$f = 1/2\pi\sqrt{(LC)}$$

Thus, the antenna 13 has a specific resonance frequency that is determined by the inductance L of the antenna coil 13a and the capacitance C of the capacitor 13c.

During the above wireless communication, the communication efficiency increases to the extent the resonance frequency f of this antenna 13 and the aforementioned frequency fc of the carrier wave coincide (are close to each other). Further, in a case where the reader 1 is disposed on a metal installation surface F, the resonance frequency f of the antenna is affected by the communication interference caused by that metal, causing the value of the resonance frequency f to fluctuate and (in comparison to a case of no metal) increase. Further, the fluctuating range (the value by which the resonance frequency f increases) at that time increases and decreases in accordance with the distance between the antenna 13 and the metal installation surface F, causing the resonance frequency f to vary (increase) to a more significant degree as the distance between the antenna 13 and the installation surface F decreases.

Here, in the present embodiment, the separated distance h from the bottom surface 3A of the antenna 13 (in other words, the distance from the installation surface F) is kept constant within a certain range (in this example, h1≦h≦h2), keeping in mind that the reader 1 is used in a form where the bottom surface 3A contacts the installation surface F. With this arrangement, the difference |fm−fo| between the resonance frequency fo when the reader 1 is fixed to a non-metal installation surface F (or sufficiently separated from the installation surface F) and the resonance frequency fm when the reader 1 is fixed to a metal installation surface F is kept within a certain range. Then, the frequency fc of the carrier wave generated by the radio frequency circuit 132 and emitted from the antenna 13 is set within the range fo<fc<fm, in accordance with the setting of such a separated distance h of the antenna 13.

In a characteristics curve of frequency vs. gain for the antenna shown in FIG. 7, a curve k1 indicated by the dashed line shows the characteristics of the resonance frequency fm of the antenna 13 when the bottom surface 3A of the reader 1 is fixed in contact with the installation surface F made of metal (hereinafter, suitably expressed as "when the reader 1 is fixed to a metal installation surface"). A curve k2 indicated by the solid line shows the characteristics of the resonance frequency fo of the antenna when the bottom surface 3A of the reader 1 is fixed in contact with the installation surface F made of a non-metal or when the reader 1 is in a single unit state with the bottom surface 3A sufficiently separated from the installation surface F (hereinafter suitably and simply referred to as "when the reader 1 is fixed to a non-metal installation surface"). Furthermore, the separated distance h of the antenna 13 at this time is set to h1=8.5 mm and h2=15.8 mm, and the carrier wave frequency fc of the antenna 13 is set to fc=13.56 [MHz] (peak value).

Figure 7:
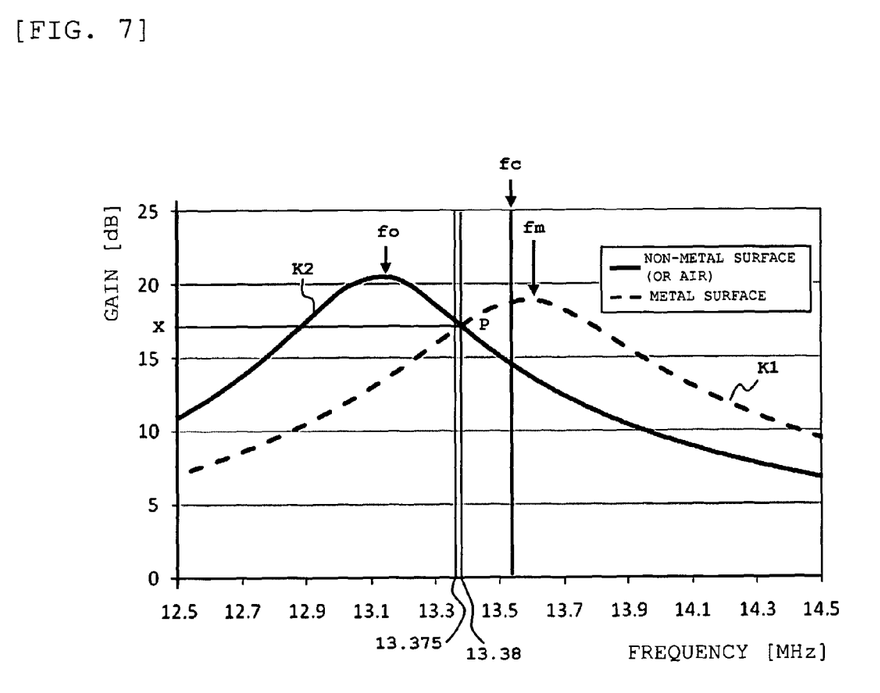
FIG. 7 is a characteristics curve of frequency vs. gain of the antenna. The horizontal axis of FIG. 7 shows the resonance frequency of antenna, and the vertical axis of FIG. 7 shows the gain of the carrier wave emitted from the antenna.

As shown in FIG. 7, the resonance frequency fm of the antenna 13 is 13.65 [MHz] (peak value) when the reader 1 is fixed to a metal installation surface, and 13.10 [MHz] (peak value) when the reader 1 is fixed to a non-metal surface. Since the carrier wave frequency fc=13.56 [MHz] as described above, it is understood that the relationship exhibits the aforementioned fo<fc<fm.

As described above, in the present embodiment, the difference between the resonance frequency fo of the antenna 13 when the reader 1 is fixed to a non-metal installation surface and the resonance frequency fm of the antenna 13 when the reader 1 is fixed to a metal installation surface is suppressed to within a limited range (in the above example, 0.55 [MHz]) and, in this state, the carrier wave frequency fc is set to a frequency between the resonance frequency fo and the resonance frequency fm. With this arrangement, the difference between the resonance frequency fo when the reader 1 is fixed to the installation surface F of a non-metal (or sufficiently separated from the installation surface F) and the carrier wave frequency fc can be made relatively small (in the above example, 0.46 [MHz]), and the difference between the resonance frequency fm when the reader 1 is fixed to the installation surface F made of a metal and the carrier wave frequency fc can also be made relatively small (in the above example, 0.09 [MHz]). As a result, whether the installation surface F is made of a metal or a non-metal, high communication efficiency can be reliably maintained.

Further, in particular, in the present embodiment, fc=13.56 [MHz] is used as the carrier wave frequency fc. With this arrangement, the differences between the carrier wave frequency fc and both resonance frequencies fo and fm can be minimized when using a general-purpose carrier wave frequency that is standard in the RFID field.

Further, in particular, in the present embodiment, the minimum value h1 of the separated distance h of the antenna 13 is set to 8.5 [mm], making it possible to suppress the fluctuating range of the resonance frequencies fo to fm to within a minimum range, and the maximum value h2 is set to 15.8 [mm], making it possible to prevent the reader 1 from becoming too large in size.

Furthermore, in the present embodiment, the separated distance h of the antenna 13 and the carrier wave frequency fc are set in mutual association, resulting in a resonance frequency fm of 13.65 [MHz] when the reader 1 is fixed to a metal installation surface and a resonance frequency fo of 13.10 [MHz] when the reader 1 is fixed to a non-metal installation surface for a carrier wave frequency fc of 13.56 [MHz]. Note, however, that the present disclosure is not limited thereto, and the separated distance h of the antenna 13 may be set in association with the carrier wave frequency fc so that the carrier wave frequency fc of the antenna 13 becomes an intermediate value (arithmetic mean) between the resonance frequency fm of a metal installation surface and the resonance frequency fo of a non-metal installation surface, that is so as to satisfy the relationship fc=(fo+fm)/2. (For reference, under the conditions of fm=13.65 [MHz] and fo=13.10 [MHz] shown in FIG. 7, the value of the carrier wave frequency fc is 13.375 [MHz]; refer to FIG. 7.)

In this case as well, because the aforementioned relationship fo<fc<fm is established, similar to the above embodiment, the respective differences between the carrier wave frequency fc and the resonance frequencies fo and fm are minimized and high communication efficiency is reliably maintained regardless of whether the reader 1 is fixed to a metal installation surface or a non-metal installation surface.

Furthermore, in the characteristics curve of frequency vs. gain of FIG. 7, the separated distance h of the antenna 13 may be set in association with the carrier wave frequency fc so that the frequency of an intersection point P of the first characteristics line k1 and the second characteristics line k2 described above coincides with the carrier wave frequency fc. (For reference, under the conditions of fm=13.65 [MHz] and fo=13.10 [MHz] shown in FIG. 7, the value of the carrier wave frequency fc is 13.38 [MHz]; refer to FIG. 7.)

According to this modification, the value of the antenna gain of the antenna 13 of the carrier wave frequency fc is the same when the reader 1 is fixed to a non-metal installation surface and when the reader 1 is fixed to a metal installation surface (the value becomes the same value X; refer to FIG. 7). That is, when such a value of the carrier wave frequency fc is set, the same antenna gain can be achieved whether the reader 1 is fixed to a non-metal installation surface F or a metal installation surface F. This makes it possible to stably maintain high communication efficiency.

What is claimed is:

1. An RFID tag communication apparatus comprising:
    a housing constituting an equipment shell including a bottom surface fixed in contact with a predetermined installation surface;
    an antenna provided at a distance h ranging from h1 to h2 from said bottom surface that transmits and receives information by wireless communication with an RFID tag including an IC circuit part that stores information and a tag antenna that transmits and receives information; and
    a radio frequency circuit including a carrier wave transmitting device that generates a carrier wave of a frequency fc for supplying power to said RFID tag, that transmits and receives information with said RFID tag;
    the frequency fc is set within a range of fo<fc<fm, in accordance with setting of the separation distance h, ranging from h1 to h2, of the antenna from said bottom surface, under the conditions that fm is set for a resonance frequency of said antenna when said bottom surface is fixed in contact with said installation surface made of a metal, and fo is set for a resonance frequency of said antenna when said bottom surface is fixed in contact with said installation surface made of a non-metal or said bottom surface is separated from said installation surface resulting in a single unit state of said RFID tag communication apparatus, wherein:
    the frequency fc and the distance h are set to satisfy the correlation as: fc=(fo+fm)/2.

2. An RFID tag communication apparatus comprising:
    a housing constituting an equipment shell including a bottom surface fixed in contact with a predetermined installation surface;
    an antenna provided at a distance h ranging from h1 to h2 from said bottom surface that transmits and receives information by wireless communication with an RFID tag including an IC circuit part that stores information and a tag antenna that transmits and receives information; and
    a radio frequency circuit including a carrier wave transmitting device that generates a carrier wave of a frequency fc for supplying power to said RFID tag, that transmits and receives information with said RFID tag;
    the frequency fc is set within the range of fo<fc<fm, in accordance with setting of the separation distance h, ranging from h1 to h2, of the antenna from said bottom surface, under the conditions that fm is set for a resonance frequency of said antenna when said bottom surface is fixed in contact with said installation surface made of a metal, and fo is set for a resonance frequency of said antenna when said bottom surface is fixed in contact with said installation surface made of a non-metal or said bottom surface is separated from said installation surface resulting in a single unit state of said RFID tag communication apparatus, wherein:
    the frequency fc and the distance h are set in association with each other so that a frequency of an intersection point of a first characteristics line and a second characteristics line coincides with the frequency fc under the conditions that said first characteristic line expresses the characteristics of the resonance frequency fm of said antenna when said bottom surface is fixed in contact with said installation surface made of a metal, and said second characteristics line expresses the characteristics of the resonance frequency fo of said antenna when said bottom surface is fixed in contact with said installation surface made of a non-metal or when said bottom surface is separated from said installation surface resulting in a single unit state of said RFID tag communication apparatus in a diagram that expresses frequency on a horizontal axis and antenna gain on a vertical axis.

3. The RFID tag communication apparatus according to claim 1, wherein: the distance h is 8.5 [mm]≦h≦15.8 [mm].

* * * * *